(12) United States Patent
Wehrs et al.

(10) Patent No.: US 7,155,983 B2
(45) Date of Patent: Jan. 2, 2007

(54) MAGNETIC FLOW METER WITH UNIBODY CONSTRUCTION AND CONDUCTIVE POLYMER ELECTRODES

(75) Inventors: David L. Wehrs, Eden Prairie, MN (US); Robert T. Chinnock, Victoria, MN (US)

(73) Assignee: Entegris, Inc., Chaska, MN (US)

( * ) Notice: Subject to any disclaimer, the term of this patent is extended or adjusted under 35 U.S.C. 154(b) by 61 days.

(21) Appl. No.: 11/052,005

(22) Filed: Feb. 4, 2005

(65) Prior Publication Data

US 2006/0174715 A1 Aug. 10, 2006

(51) Int. Cl.
*G01F 1/58* (2006.01)
(52) U.S. Cl. .................................... 73/861.12
(58) Field of Classification Search .............. 73/861.12
See application file for complete search history.

(56) References Cited

U.S. PATENT DOCUMENTS

| | | | |
|---|---|---|---|
| 4,098,118 A | 7/1978 | Schmoock |
| 4,125,019 A | 11/1978 | Cushing |
| 4,181,018 A | 1/1980 | Schmoock |
| 4,214,477 A | 7/1980 | Schmoock |
| 4,253,340 A | 3/1981 | Schmoock |
| 4,358,963 A | 11/1982 | Schmoock |
| 4,388,834 A | 6/1983 | Schmoock |
| 4,420,982 A | 12/1983 | Schmoock |
| 4,497,212 A | 2/1985 | Schmoock |
| 4,565,619 A | 1/1986 | Gardner et al. |
| 4,567,775 A | 2/1986 | Schmoock |
| 4,774,844 A | 10/1988 | Davis |
| 5,263,374 A | 11/1993 | Marsh |
| 5,280,727 A * | 1/1994 | Hafner et al. ............ 73/861.12 |
| 5,316,035 A | 5/1994 | Collins et al. |
| 5,449,017 A | 9/1995 | Collins et al. |
| 6,539,981 B1 | 4/2003 | Kleven et al. |
| 2003/0097882 A1 | 5/2003 | Schlosser et al. |
| 2004/0060366 A1 | 4/2004 | Yamamoto |

* cited by examiner

*Primary Examiner*—Harshad Patel
(74) *Attorney, Agent, or Firm*—Patterson, Thuente, Skaar & Christensen, P.A.

(57) ABSTRACT

A magnetic flow metering device and method is disclosed for the measurement of corrosive flow streams. The device utilizes a unibody construction wherein the flow conduit is constructed entirely from an insulative, non-conducting material without resorting to a metallic outer housing. The portions of the electrodes in contact with the flow stream are made of a suitable conductive polymer material, resistant to the corrosive media. The electrodes also feature shields that are molded into the electrode assembly to reduce background electrical noise. The invention also utilizes an electrical configuration that actively drives the electrode shield circuit (electrodes as well as cabling) to provide a more accurate measurement of the electromotive force.

15 Claims, 3 Drawing Sheets

MAGNETIC FLOW METER WITH UNIBODY CONSTRUCTION AND CONDUCTIVE POLYMER ELECTRODES

FIELD OF THE INVENTION

The invention relates to the monitoring and measurement of fluid flow in a conduit and particularly to magnetic flow meters for use in the semiconductor industry.

BACKGROUND OF THE INVENTION

The theory of operation of a magnetic flow meter ('magflow meter') is based on Faraday's law of induced voltage, wherein an electromotive force (EMF) is produced that is proportional to the velocity of a conducting medium that flows through a magnetic field. Typically, in the case of a magflow meter, the flowing medium is a conductive medium passed through a section of conduit that is subjected to a transverse magnetic flux. As the conductive fluid passes through the conduit, the resulting EMF is detected by electrodes that are mounted to the conduit walls and in physical contact with the medium. To prevent shorting of the EMF, the conduit walls are constructed of a non-conductive material.

Magflow meters have found application in the process control industries (chemical, food-and-beverage, pulp and paper, water treatment) because they have low measurement error (0.2% of reading attainable) over a broad range (typically 30:1) and they require no moving parts (unlike turbine meters or paddlewheel technology) or flow restriction (unlike differential pressure meters) to operate. Magflow meters can also be configured to resist the deleterious effects of the harsh chemicals of the flow stream medium through proper selection of the materials for the electrodes and conduit walls.

Previous designs have utilized a conduit fabricated from a non-conducting material to provide the desired electrical isolation. The electrodes are mounted so that the tips are flush with the interior wall. Other designs have implemented a conduit constructed of a non-conducting liner within a metallic outer housing, with the tips of the electrodes protruding into the flow stream.

Various prior art designs possess certain disadvantages that prevent the realization of the full benefits of the magflow meter. Most magflow meters utilize a dielectric sleeve within a metal housing. Outfitting a metal housing with a dielectric liner is a costly process. Current magflow meters are complicated assemblies requiring hardware to be welded or otherwise attached to the metal housing for the mounting of the electrode and electromagnetic assemblies. Furthermore, these approaches typically teach the use of metallic electrodes, which are incompatible with applications and processes in other industries.

SUMMARY OF THE INVENTION

Despite the technological advantages of magnetic flow meters, they have not typically been used or applied in the semiconductor industry. This is thought to be due to the ultra pure and highly corrosive nature of the liquids (acids and bases such as HCl and $NH_4OH$) and gases commonly used in the industry. Purity must be maintained to sub-parts per billion ("PPB") levels. To maintain this level of purity, materials in contact with the corrosive fluid must neither corrode nor produce any ionic contamination. Therefore, flow meters completely constructed of non-metallic and non-corroding wetted materials such as PTFE or PFA (or other polymers in the same family) are strongly preferred. This requirement has eliminated magnetic flowmeters from use because the electrode in contact with the liquid must be able to conduct the EMF signal and therefore are usually constructed of metals such as 316 stainless steel, hastelloy or platinum.

In addition, magflow meters are typically large, bulky devices not conducive to the small size and flow rate requirements of the semiconductor industry. A primary driver of the size is the requirement in the process industry to function properly over a wide range of pressures and temperatures, necessitating the formation of the conduit from either an expensive material such as ceramic or a PTFE or PFA lined metallic pipe.

The invention in the following example embodiments is a magnetic flow meter wherein the flow conduit is constructed entirely from an insulative, non-conducting material without a metallic outer housing. The non-conducting conduit has a flow cross-section that defines a wetted perimeter containing a fluid that flows along an axis normal to the flow cross-section. The conduit is fitted with a pair of magnetic poles that spans the flow cross-section in a diametrically opposed configuration. The magnetic poles define a first lateral axis that substantially intersects the flow axis. A pair of electrodes is also disposed on the sides of the conduit, defining a second lateral axis that intersects both the flow axis and the first lateral axis formed by the magnetic poles. The electrodes are made of a conductive polymer material that is resistant to the corrosive media of the flow stream. The electrodes penetrate the wetted perimeter of the conduit to make contact with the fluid flowing within.

An advantage of the various embodiments of the invention is that the conduit is fabricated from a dielectric material, without incorporating a metallic outer housing, thus reducing the cost and complexity of lining the conduit. Furthermore, the conduit is fabricated to easily and directly accept the electrode and electromagnetic assemblies, further reducing cost and assembly complexity.

Another advantage of the various embodiments of the invention is that the conductive polymer (or plastic) electrodes are resistant to chemical attack. As disclosed in U.S. Pat. No. 5,449,017, the conductive polymer (or plastic) electrodes may be constructed from a polymer material suitable for the particular medium under measurement, including but not limited to blends of PTFE or PFA. These electrodes also feature shields that are molded into the electrode assembly to reduce background electrical noise.

An aspect of the invention addresses a problem of signal attenuation in electromagnetic flow meters. When an electrode contacts an electrolytic fluid (e.g. water or an acid or a base), the electrical connection between the fluid and the electrode is not a simple resistance. Rather, the fluid/electrode interface creates a complex impedance (an impedance having a reactive component) that is also a function of several physical properties or factors, such as the electrical conductivity of the fluid with which it is in contact, as well as the size and material of the electrode. With a standard metal electrode, this complex impedance forms a voltage divider with the capacitance of the electrical connection means that connects the electrode to the electronics. Therefore, an attenuated voltage is presented to the amplifier, the attenuation being a function of the capacitance of the connection means relative to the complex impedance of the fluid/electrode interface. The dominance of the voltage divider effect is especially prevalent in small magnetic flow meters, because the electrodes are compact and have a high complex impedance at the fluid/electrode interface.

Another advantage of one of the various embodiments of the invention utilizes an electrode construction that electrically drives an electrode shield circuit (electrodes and cabling), thereby reducing the effective cable impedance relative to the complex impedance of the fluid/electrode interface to provide a more accurate measurement of the electromotive force.

BRIEF DESCRIPTION OF THE DRAWINGS

The invention may be more completely understood in consideration of the following detailed description of various embodiments of the invention in connection with the accompanying drawings, in which:

FIG. 5 is a schematic of a prior art electrode assembly;

Figure 1:
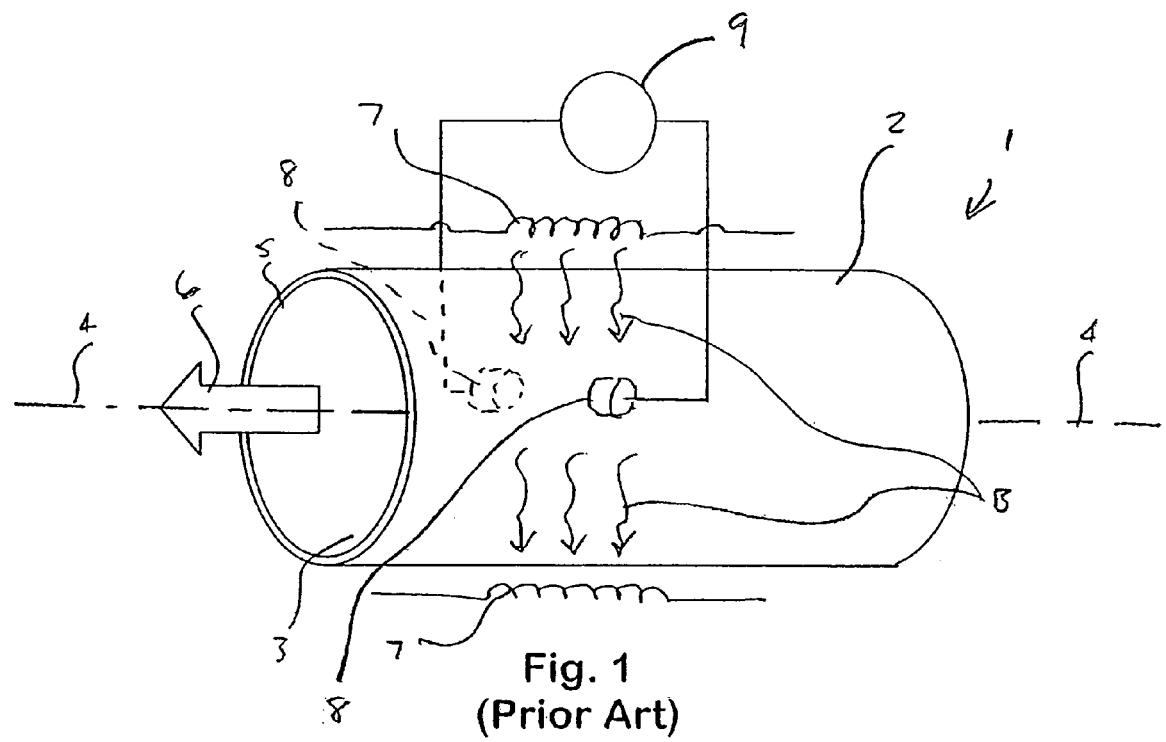
FIG. 1 is a cut away view of a prior art magnetic flow meter.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

The invention is generally directed to an apparatus and a system for measuring the flow velocity of corrosive chemical fluids in a semiconductor fabrication facility. While the invention is not necessarily limited to such an application, the invention will be better appreciated using a discussion of example embodiments in such a specific context.

Magnetic flowmeters are used to measure the volumetric flow rate of electrically conductive liquids. They operate on Faraday's principle of induced voltage, expressed by $$emf \propto B \cdot L \cdot U$$

where emf is a electromotive force (volts), B is a magnetic flux density (gauss), L is a spanwise length or thickness through the conductive liquid across which emf is generated (e.g., cm), and U is the local velocity of the conductive liquid being metered (e.g., cm/sec).

Referring to FIG. 1, there is illustrated a prior art magnetic flow meter 1 that includes a housing 2 defining a conduit 3 having a central flow axis 4, a wetted perimeter 5, and containing a fluid flow 6 that flows substantially parallel to flow axis 4. A pair of magnetic poles 7 is situated on the perimeter of housing 2 generating a magnetic field B there between. A pair of electrodes 8 is disposed on either side of housing 2 and penetrate wetted perimeter 5 so as to be in contact with fluid flow 6. Electrodes 8 are connected to a read out device 9 for detection of an electromotive flux emf.

Figure 2:
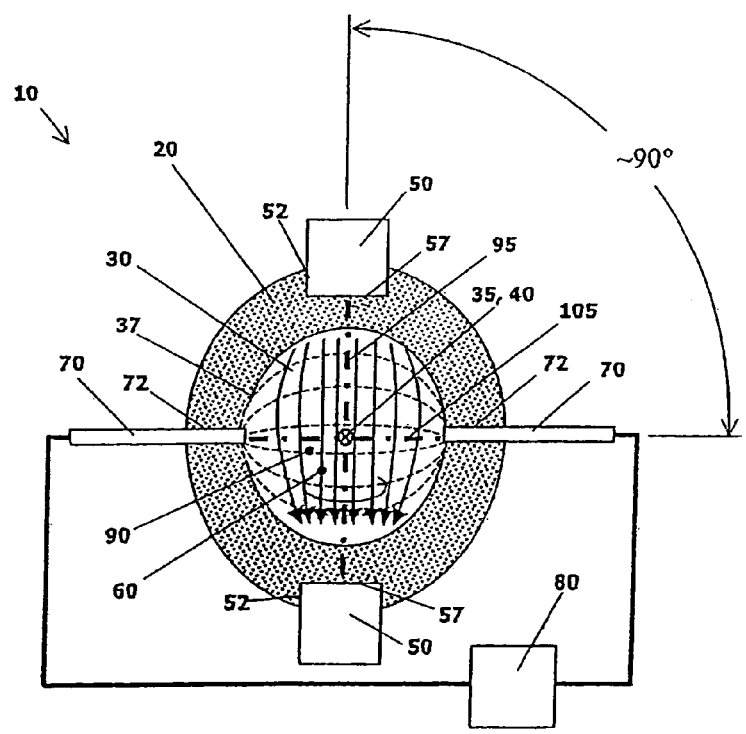
FIG. 2 is a cross-sectional view normal to the flow channel, with schematic of appurtenances, of the invention.

Referring now to FIG. 2, an example embodiment of a magnetic flow meter 10 according to the invention is shown in cross-section. Meter 10 includes a unibody housing 20, which is represented as a hollow cylinder that defines a conduit 30 and a wetted perimeter 37, configured for containing a fluid flow 40. Magnetic poles 50 are mounted on the top and bottom of housing 20. Because housing 20 is constructed of a dielectric material, each magnetic pole 50 is mounted in a bottomed port 52 that is formed within the wall of housing 20. Bottomed ports 52 are so-defined because they do not penetrate wetted perimeter 37, but instead terminate within housing 20, thus defining a bottom portion 57. Bottomed ports 52 are aligned along a first lateral axis 95 that passes through flow axis 35.

The embodiment of FIG. 2 also illustrates a pair of electrodes 70 as being located on the same plane as and about 90-degrees with respect to magnetic poles 50. Each electrode 70 is mounted in a through-port 72 that penetrates housing 20 and wetted perimeter 37, thus creating a fluid communication between each through-port 72 and conduit 30. Electrodes 70 are aligned along a second lateral axis 105 that intersects both flow axis 35 and first lateral axis 95. The 90-degree orientation, though preferred, is not necessary for the magnetic flow meter to be operative. The cross section of FIG. 2 shows the relationship between a magnetic field 60 and an electromotive flux ("EMF") field 90 that is sensed between electrodes 70.

Electrodes 70 are also connected to a read out device 80 that senses a voltage potential caused by EMF 90. Read out device 80 may be configured to convert the voltage to engineering units (e.g., cm/sec.) before displaying.

Figure 3A:
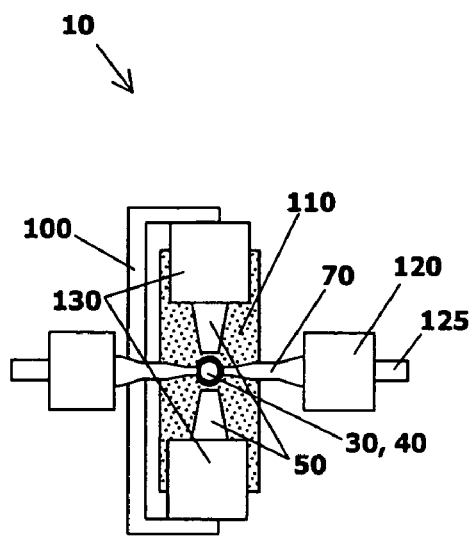
FIG. 3A is a cross-sectional view of the invention, normal to the flow channel.

Referring to FIG. 3A, another embodiment of the invention is shown in cross-section wherein magnetic flow meter 10 is formed from an insulative, non-contaminating, chemically inert material mass or body 110. As used herein, the term "insulative" refers to a property of the material of mass or body 110 that is both electrically non-conducting and chemically resistant and inert to a corrosive chemical fluid flow 40, thereby "isolating" fluid flow 40. Conduit 30 is formed to flow through insulative mass 110. A pair of electromagnetic coils 130 is housed within mass (or body) 110. In this configuration, magnetic poles 50 are driven by electromagnetic coils 130, which are connected by a magnetic return path 100. FIG. 3A also shows electrodes 70 as being terminated with an electrode connector 120. Electrode connectors 120 are each connected to instrumentation cable 125 that is subsequently routed to a read out device 80 (not shown).

Figure 3B:
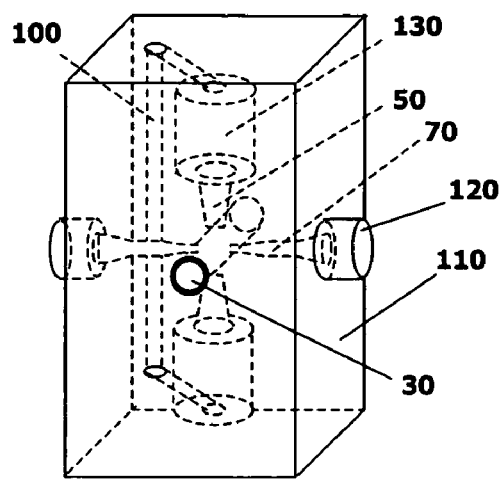
FIG. 3B is an isometric projection of the invention.

FIG. 3B shows an isometric projection of another embodiment of the invention that is shrouded and protected from the environment. A flow passage 30 is formed through insulative mass (or body) 110 with the various components (magnetic poles 50, electromagnetic coils 130, shielded electrodes 70 and magnetic return path 100) contained within insulative mass 110. By housing the components within insulative mass 110, the components are protected from typical operations in the manufacturing environment, such as dust and dirt, maintenance wash downs and chemical spills. The cost and complexity of manufacturing is also significantly reduced.

Figure 3C:
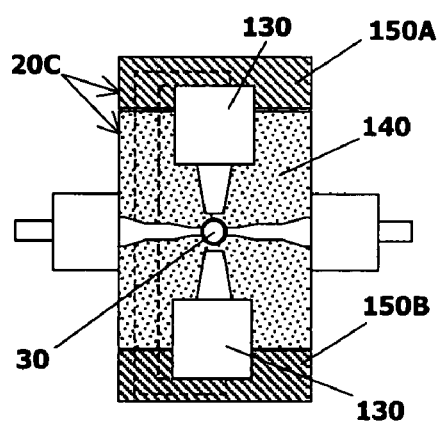
FIG. 3C is a cross-sectional view of the invention, normal to the flow channel.

Referring to FIG. 3C, another embodiment of the invention is shown that includes an inner portion 140 of a housing 20C. Inner portion 140 is capped off with outer portion 150A and 150B. This arrangement allows the electromagnetic coils 130 to be mounted in housing 20C and then capped off so as to be protected from the environment.

Figure 3D:
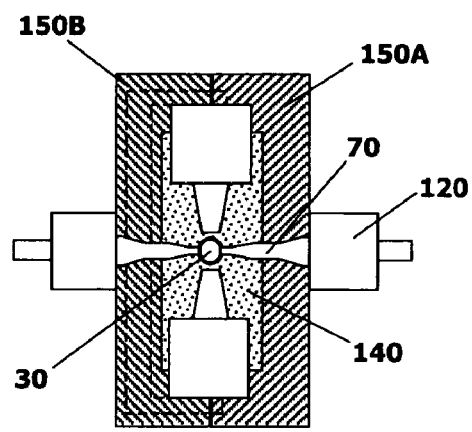
FIG. 3D is a cross-sectional view of the invention, normal to the flow channel.

A similar embodiment of the invention is shown in FIG. 3D. This embodiment shows outer portions 150A and 150B configured in a clamshell arrangement. In this embodiment, the outer portions 150A and 150B combine to circumscribe inner portion 140. Electrode connectors 120 are then connected to electrode 70 to form a hermetic seal that protects the interior components from the environment.

Figure 4A:
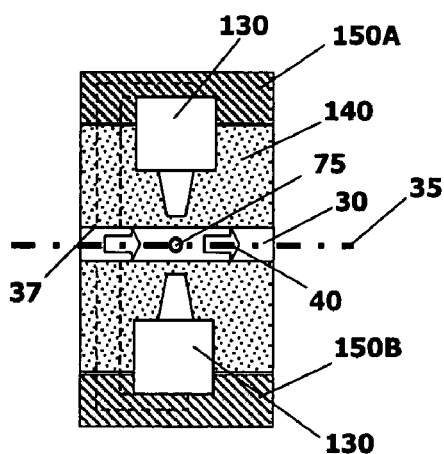
FIG. 4A is a cross-sectional view of the invention, through the plane of the flow channel.

Referring to FIG. 4A, a depiction of a side view of the FIG. 3C embodiment is shown in cross-section. This figure shows flow conduit 30 passing through inner portion 140 along flow axis 35. An end 75 of electrode 70 can also be seen on the wetted perimeter 37 of flow conduit 30. Note that end 75 is in fluid contact with fluid flow 40.

Figure 4B:
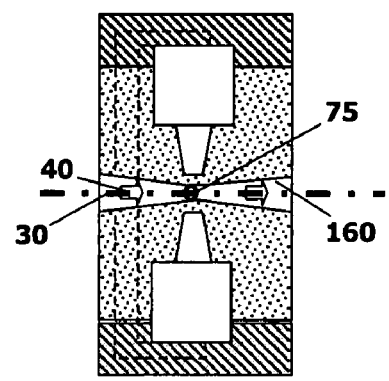
FIG. 4B is a cross-sectional view of the invention, through the plane of the flow channel.

Another related embodiment of the invention is illustrated in FIG. 4B, which includes flow conduit 30 is formed into a convergent/divergent flow passage 160. This geometry of conduit 30 acts to constrict fluid flow 40 as the fluid flow passes through magnetic field 60, thereby increasing flow velocity U. Because the electromotive flux generated is proportional to U, convergent/divergent flow passage 160 acts to generate a greater electromotive flux 90, thereby improving the signal-to-noise ratio detected by read out device 80.

Figure 5A:
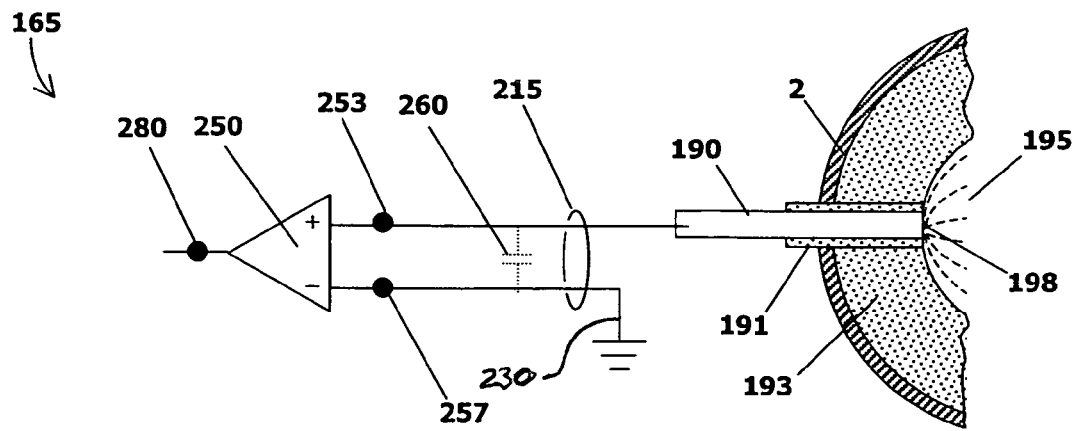
FIG. 5A is a schematic of a prior art electrode assembly.
Figure 5B:
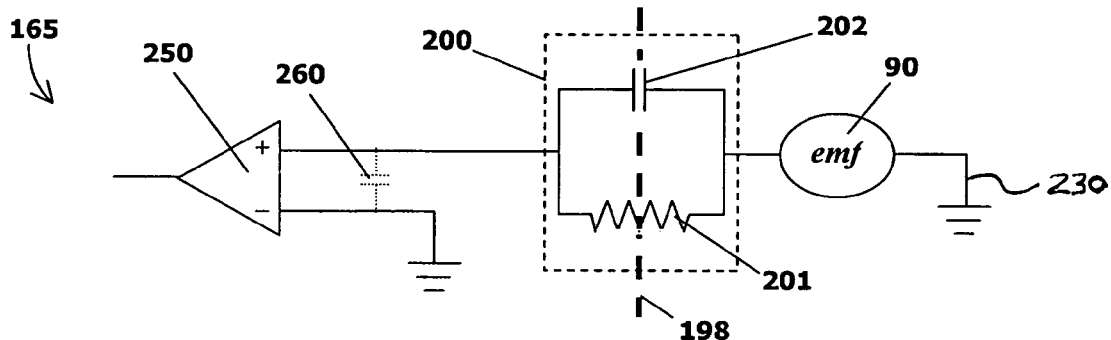
FIG. 5B is a schematic of a prior art electrode assembly.

Referring now to FIGS. 5A and 5B, a prior art electrode assembly 165 is pictorially and schematically represented. Assembly 165 includes a central conducting member 190 connected to the non-inverting input 253 of an amplifier 250 via an electrical connecting means 215. The inverting input 257 of amplifier 250 is connected to an electrical ground 230. Central conducting member 190 passes through housing 2 and a dielectric liner 193 and is electrically isolated from housing 2 by means of an insulative sleeve 191. Central conductor 190 contacts an electrolytic fluid 195 (e.g. water or an acid or a base) at a fluid/conductor interface 198. A complex impedance 200 having an active component 201 and a reactive component 202 develops between fluid 195 and central conductor 190. Complex impedance 200 forms a voltage divider with the impedance of electrical connection means 215. Therefore, an incorrect or attenuated voltage is presented to amplifier 250. This "voltage divider effect" is a function of a parasitic capacitance 260 of the connection means 215 (represented in FIG. 6 by a capacitor in phantom) and the complex impedance 200. The dominance of the voltage divider effect is especially prevalent in compact magnetic flow meters with metallic probes, because the electrodes are small and therefore complex impedance 200 at interface 198 is high. Also, impedance 200 is a function of several physical properties, including the electrical conductivity of fluid 195, the size of central conductor 190, and the material of central conductor 190. Because the conductivity of fluid is susceptible to change unrelated to the flow rate, the attenuation can be dynamic.

Figure 6:
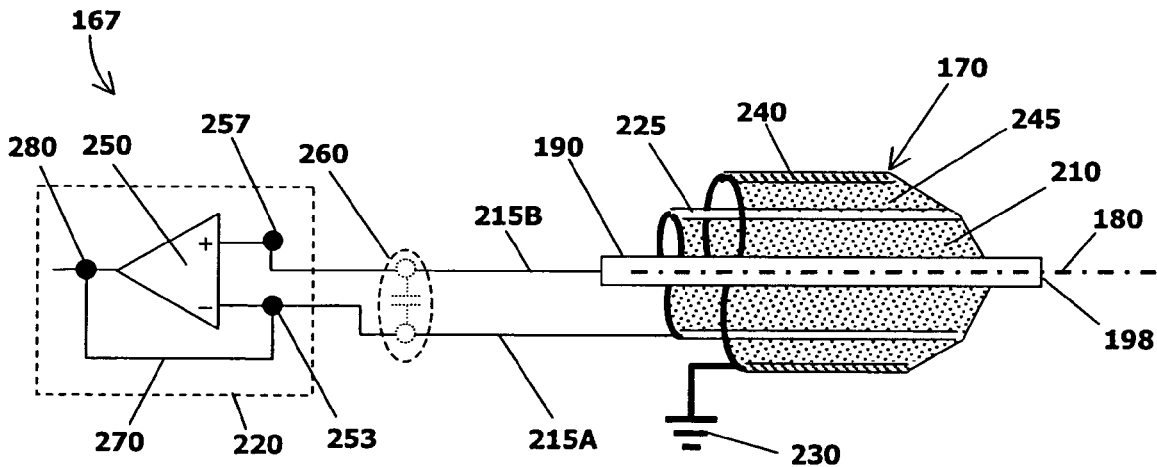
FIG. 6 is a schematic of an electrode assembly according to the present invention.

An embodiment of an electrode assembly 167 according to the invention is shown in FIG. 6. Assembly 165 includes an electrically shielded electrode 170. Electrode 170 has a longitudinal axis 180 along which central conducting member 190 is located. Central conductor 190 is in a concentric arrangement with an annular conducting member 225. Both the central conducting member and the annular conducting member are connected to a signal amplifier 220 via electrical connecting means 215 (215A, 215B). Annular conducting member 225 and central conducting member 190 are electrically isolated from each other by way of a first insulative member 210. A shield member 240 surrounds and is concentric with annular conducting member 225. Shield member 240 is connected to electrical ground 230. The schematic of a signal amplifier 220 shows amplifier 250 with non-inverting input 257 connected to central conductor 190 and inverting input 253 connected to annular conducting member 225. A jumper connection 270 connects the inverting input 253 to the op amp output 280. The FIG. 6 embodiment operates to drive inherent capacitance 260 to a low impedance, thereby reducing the dynamic error caused by the interaction between the complex impedance 200.

Conducting members 190 and 225 may be fabricated from a conductive plastic, as disclosed in U.S. Pat. Nos. 5,316,035 and 5,449,017, both of which are hereby incorporated by reference. Herein, the term "plastic" refers generally to polymers, fluoropolymers or other dielectric materials particularly suited to resist the deteriorating effects of a corrosive atmosphere environment both within and outside the magnetic flow meter. Examples of a "plastic" include, but are not limited to, polyvinylidine fluoride (PVDF), polyetheretherketone (PEEK), perfluoroalkoxy (PFA), polytetrafluoroethylene (PTFE) or other materials known to persons of skill in the art to be of suitable chemical resistance. Wherein this application reference is made to a "conductive plastic," the plastic is filled with particles or fibers of a conductive material that are added integrally and distributed throughout the plastic. The conductive material thus impregnated may include, but is not limited to, carbon or iron or both. Such plastics may be used in the central and annular conductive plastic sensing elements 190 and 225, and shield member 240.

While the particular magnetic flow meter embodiments presented and discussed in detail above are fully capable of obtaining the objects and providing the advantages stated, it is to be understood that they are merely illustrative of the present invention. Various other modifications and changes with which the invention can be practiced and which are within the scope of the description provided herein will be readily apparent to those of ordinary skill in the art.

What is claimed is:

1. A magnetic flow meter comprising:

a housing having a conduit formed therethrough, said conduit having an axis of flow;

a pair of magnetic poles disposed on either side of said conduit in a diametrically opposed relationship, said pair of magnetic poles being located on and in alignment with a first lateral axis that substantially intersects said axis of flow;

a pair of electrically shielded electrodes disposed on either side of said conduit in a diametrically opposed relationship, said electrodes being in fluid communication with said conduit and defining a second lateral axis that substantially intersects both said first lateral axis and said axis of flow;

wherein each of said shielded electrodes has a longitudinal axis and is comprised of a central conductive member, an annular conductive member, and a shield member made from at least one electrically conductive material and arranged in a substantially concentric manner with said central conductive member located on said longitudinal axis and said annular member being located between said central conductive member and said shield member;

said central conductive member and said annular conductive member separated by a first interstitial insulative member; and said central conductive member and said annular conductive member adapted to be coupled to a signal amplifier, said shield member adapted to be coupled to an electrical ground.

2. The magnetic flow meter of claim 1 wherein:

said signal amplifier comprises an amplifier having an inverting input, a non-inverting input, and an output;

said central conductive sensing member and said annular conductive member connected to said inverting input and said non-inverting input of said amplifier, respectively; and said inverting input electrically connected to said amplifier output.

3. The magnetic flow meter of claim 2, wherein said central conductive member and said annular conductive member are comprised of a conductive plastic.

4. A magnetic flow meter comprising:

a housing having a conduit with an axis of flow;

a pair of magnetic poles disposed on either side of said conduit in a diametrically opposed relationship, said pair of magnetic poles aligned with a first lateral axis that substantially intersects said axis of flow;

a pair of electrodes disposed on either side of said conduit in a diametrically opposed relationship, said electrodes aligned with a second lateral axis that substantially intersects both said first lateral axis and said axis of flow, said electrodes comprising a conductive plastic sensing member configured from at least one from the group consisting of polyetheretherketone and a fluoropolymer material.

5. The magnetic flow meter of claim 4, wherein each of said electrodes are configured in a shielded arrangement having a longitudinal axis, a central conductive member, an annular conductive member, and a shield member made from at least one electrically conductive material and arranged in a substantially concentric manner with said central conductive member located on said longitudinal axis and said annular conductive member being located between said central conductive member and said shield member;

said central conductive member and said annular conductive member separated by a first interstitial insulative member; and said central conductive member and said annular conductive member adapted to be coupled to a signal amplifier, said shield member adapted to be coupled to an electrical ground.

6. The magnetic flow meter of claim 4, wherein said conductive plastic comprises a fluoropolymer impregnated with carbon particulates or carbon fibers.

7. A magnetic flow meter comprising:

a housing formed from an insulative, non-contaminating, chemically inert material, said housing having an inner portion, at least one outer portion, and a conduit for fluid flow therethrough, said conduit having an axis of flow;

said housing having a pair of diametrically opposed bottom ports formed therein and adjacent said conduit, said bottom ports being aligned with a first lateral axis that substantially intersects said axis of flow, wherein each of said bottomed ports are configured to secure a magnetic pole;

said housing having a pair of diametrically opposed through-ports formed therethrough and in fluid communication with said conduit, said through-ports being aligned with a second lateral axis that substantially intersects both said first lateral axis and said axis of flow, wherein each of said through-ports are configured to secure an electrode;

a pair of magnetic poles adapted to be inserted respectively into each of said pair of bottomed ports;

a pair of electrodes, wherein the electrodes are adapted to be inserted respectively into each of said pair of through-ports;

wherein said outer portion or portions are adapted to enclose said pair of electrodes and said pair of magnetic poles.

8. The magnetic flow meter of claim 7, wherein said magnetic poles comprise electromagnets that are connected by a magnetic return path, said housing is adapted to enclose said magnetic return path, and said electrodes have a conductive plastic sensing member.

9. The magnetic flow meter of claim 7, wherein said electrodes comprise a carbon-impregnated polymer material.

10. The magnetic flow meter of claim 7, wherein the insulative material is formed from a non-contaminating polymer.

11. A housing for a magnetic flow meter comprising:

a body fabricated from an insulative, non-contaminating, chemically inert material, said body having an inner portion, at least one outer portion, and a conduit for fluid flow therethrough, said conduit having a flow axis;

said body having a pair of diametrically opposed bottomed ports formed therein, said bottomed ports located on and aligned with a first lateral axis that substantially intersects said flow axis of said conduit, wherein said pair of diametrically opposed bottomed ports are adapted to receive a pair of magnetic poles;

said body having a pair of diametrically opposed through-ports formed therethrough and accessing said conduit, thereby defining a second lateral axis that substantially intersects both said flow axis and said first lateral axis, said pair of through-ports adapted to receive a pair of electrodes; and said at least one outer portion being adapted to cover said pair of bottomed ports.

12. The housing of claim 11, wherein said non-contaminating material is selected from the group consisting of polytetrafluoroethylene (PTFE), polyvinylidine fluoride (PVDF), polyetheretherketone (PEEK), perfluoroalkoxy (PFA), and other fluorocarbon polymers.

13. The housing of claim 11, wherein said second lateral axis of said pair of diametrically opposed through-ports is substantially normal to said first lateral axis of said pair of diametrically opposed bottomed ports.

14. A method of measuring a flow of chemically corrosive fluid with a magnetic flow meter within a corrosive fluid flow circuit comprising:

connecting said magnetic flow meter in said fluid flow circuit, said magnetic flow meter including an insulative, non-contaminating, chemically inert housing having a flow cross-section and a longitudinal axis normal to said flow cross-section that defines a conduit for fluid flow therethrough;

a pair of magnetic poles diametrically opposed to each other and disposed on opposing sides of said longitudinal axis of said insulative housing;

a pair of electrodes diametrically opposed to each other and disposed on opposing sides of said longitudinal axis of said insulative housing, said electrodes comprised of a fluoropolymer material;

creating a magnetic field that passes through said longitudinal axis, thereby inducing a voltage difference between said electrodes; and measuring said voltage difference between said electrodes and correlating said voltage difference to a fluid flow velocity of said corrosive fluid.

15. A magnetic flow meter comprising:

an insulative, non-contaminating, chemically inert housing having a conduit formed therethrough, said conduit having an axis of flow;

means for generating a magnetic field that is substantially perpendicular to said axis of flow; and means for detecting an electromotive flux that is substantially perpendicular to said axis of flow, wherein said flux detecting means is adapted to be shielded to maximize flux detection and is configured from a fluoropolymer material impregnated with a conductive material adapted to sensing said electromotive flux.

* * * * *